(12) United States Patent
Pushkolli et al.

(10) Patent No.: US 8,494,801 B2
(45) Date of Patent: Jul. 23, 2013

(54) METHOD AND SYSTEM FOR DETERMINING THE ROTOR TEMPERATURE OF AN ELECTRIC MOTOR OF A HYBRID VEHICLE

(75) Inventors: Beqir Pushkolli, Ludwigsburg (DE); Stefan Blind, Fellbach (DE); Klaus Rechberger, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 235 days.

(21) Appl. No.: 12/992,210

(22) PCT Filed: Apr. 21, 2009

(86) PCT No.: PCT/EP2009/054692
§ 371 (c)(1),
(2), (4) Date: Jan. 26, 2011

(87) PCT Pub. No.: WO2009/138312
PCT Pub. Date: Nov. 19, 2009

(65) Prior Publication Data
US 2011/0119014 A1 May 19, 2011

(30) Foreign Application Priority Data
May 15, 2008 (DE) .................. 10 2008 001 807

(51) Int. Cl.
*G01K 15/00* (2006.01)
(52) U.S. Cl.
USPC .......................................... 702/99

(58) Field of Classification Search
USPC ............................. 702/99, 182–185
See application file for complete search history.

(56) References Cited

U.S. PATENT DOCUMENTS

| 4,719,361 | A | * | 1/1988 | Brubaker | 290/45 |
| 5,432,413 | A | * | 7/1995 | Duke et al. | 318/139 |
| 5,887,670 | A | * | 3/1999 | Tabata et al. | 180/65.25 |
| 2002/0006154 | A1 | * | 1/2002 | Nada | 374/169 |
| 2008/0001564 | A1 | * | 1/2008 | Tate et al. | 318/434 |
| 2008/0036415 | A1 | * | 2/2008 | Kaizuka et al. | 318/730 |
| 2008/0314658 | A1 | * | 12/2008 | Atarashi et al. | 180/65.2 |

FOREIGN PATENT DOCUMENTS

| DE | 102 54 295 | 6/2004 |
| KR | 2003 0093299 | 12/2003 |
| WO | WO 03/021749 | 3/2003 |

OTHER PUBLICATIONS

International Search Report in International Application No. PCT/EP2009/054692 dated Aug. 25, 2009.

* cited by examiner

*Primary Examiner* — Edward Raymond
(74) *Attorney, Agent, or Firm* — Kenyon & Kenyon LLP

(57) ABSTRACT

A method and a system for determining the rotor temperature of an electric motor of a hybrid vehicle. In a method for determining the rotor temperature of an electric motor of a hybrid vehicle in which it is possible to reliably determine the rotor temperature using simple means, the rotor temperature of the electric motor being ascertained by measuring an operating parameter of the electric motor during operation of the hybrid vehicle.

9 Claims, 2 Drawing Sheets

METHOD AND SYSTEM FOR DETERMINING THE ROTOR TEMPERATURE OF AN ELECTRIC MOTOR OF A HYBRID VEHICLE

BACKGROUND INFORMATION

Vehicles having a hybrid drive in which various drives are used for the drive function are increasingly being developed. In this connection, the individual motors are able to cooperate in different ways in the hybrid drive.

They function either simultaneously or only one drive unit acts on the vehicle to be moved.

Frequently, the hybrid drive in a motor vehicle is made up of an internal combustion engine and an electric motor. In this case, the rotor temperature of the electric motor must be constantly monitored to ensure that this component is protected.

In motor vehicle technology, it is unsuitable to measure the rotor temperature of the electric motor using a temperature sensor due to insufficient space for a temperature sensor or excessively high costs. For that reason, the rotor temperature is calculated using a temperature model, the rotor temperature being a function of the magnetic flux linkage. As the magnets of the electric motor are demagnetized in an excessively heated motor and accordingly the magnetic flux is changed, this results in an incorrect calculation of the rotor temperature.

German Patent No. DE 102 54 295 describes calculating the rotor temperature in permanently excited polyphase machines based on an instantaneous no-load voltage and a reference no-load voltage.

An object of the present invention is therefore to provide a method and a system for determining the rotor temperature of an electric motor of a hybrid vehicle in which reliable determination of the rotor temperature is possible using simple means.

SUMMARY OF THE INVENTION

An advantage of the present invention is that the method according to the present invention for determining the rotor temperature is independent of the electrical parameters such as the magnetic flux linkage of the electric motor. No separate determination of the magnetic flux linkage is necessary. Such flux changes, which are unfortunately unavoidable in mass production, are indirectly considered by the method according to the present invention by ascertaining the rotor temperature of the electric motor via a measurement of an operating parameter of the electric motor during operation of the hybrid vehicle.

A particularly simple procedure for reliably determining the actual rotor temperature as a function of the fluctuations of the magnetic flux linkage is to ascertain the rotor temperature via a measurement of a short-circuit current of the electric motor. Such a measurement may be performed in a simple manner at any time during the operation of the hybrid vehicle.

Starting from the measured short-circuit current, the rotor temperature is calculated as a function of an ambient temperature.

In one refinement, after a second driving machine of the hybrid vehicle, in particular an internal combustion engine, is started, the electric motor is run up to a predefined rotational speed, the electric motor is then short-circuited and the resulting short-circuit current is measured. Starting from a predefined rotational speed, the short-circuit current of the electric motor is assumed to be independent of rotational speed. This type of determination of the short-circuit current is particularly suitable for hybrid vehicles in a cold state.

During travel of a hybrid vehicle, when a setpoint torque of the electric motor is equal to zero, the electric motor is short-circuited and the short-circuit current is measured. Such a situation occurs whenever the internal combustion engine takes over the drive of the hybrid vehicle alone, as is, for example, the case when stopping at an intersection or a signal light. As the short-circuit current is determined in only a few milliseconds, the operating behavior of the hybrid vehicle is not at all adversely affected by this measurement and the rotor temperature of the electric motor is reliably determined even during travel of the hybrid vehicle.

A particularly concrete result of the rotor temperature is obtained when the short-circuit current ascertained during travel of the hybrid vehicle is divided by the short-circuit current ascertained in the cold state of the hybrid vehicle.

In one embodiment of the present invention, a first rotor temperature of the electric motor is determined using a computational algorithm and the second rotor temperature of the electric motor is determined by measuring the short-circuit current of the electric motor, the first and second rotor temperatures being compared with one another and the first rotor temperature being corrected as a function of the second rotor temperature if a difference is detected. This procedure may be used to ascertain in a simple manner the differences between the calculated rotor temperature, which is calculated continuously in the control unit of the electric motor, and the actual rotor temperature.

If a difference is detected, the first rotor temperature is advantageously set to be equal to the second rotor temperature, which ensures that the rotor temperature is ascertained independently of the electrical parameters of the electric motor.

To monitor the power of the hybrid vehicle, the corrected first motor temperature is supplied for further processing to at least one control unit of the hybrid vehicle which monitors the power level of all electrical consumers in the hybrid vehicle. If the corrected first rotor temperature exceeds a limit value, the power of at least one electrical consumer of the hybrid vehicle is reduced. This primarily applies to comfort devices such as the air conditioning system, on-board computer, seat heating, etc. This measure balances the temperature equilibrium within the hybrid vehicle's engine compartment and prevents an additional feed of heat to the electric motor from the outside.

In another refinement of the present invention, a system for determining the rotor temperature of an electric motor of a hybrid vehicle has means which ascertain a rotor temperature of the electric motor by measuring an operating parameter of the electric motor during operation of the vehicle.

This system has the advantage that the rotor temperature is measured independently of the electrical parameters of the electric motor such as voltage in transverse or longitudinal direction, current in transverse and longitudinal direction, inductance in transverse and longitudinal direction or stator resistance. Temperature sensors and their complex installation in the electric motor are unnecessary. Furthermore, the electrical operating parameters may be measured in a simple and cost-effective manner. A particularly simple implementation is for a control unit to determine the rotor temperature by measuring a short-circuit current of the electric motor.

Advantageously, the control unit of the electric motor determines the first rotor temperature of the electric motor using a computational algorithm and the second rotor temperature using the short-circuit current, the first and the second rotor temperature being compared with one another, the first rotor temperature being corrected as a function of the second rotor temperature if a difference is detected and the control unit of the electric motor being connected to at least one consumer control unit of the hybrid vehicle for transmission of the corrected first rotor temperature.

DETAILED DESCRIPTION

Figure 1:
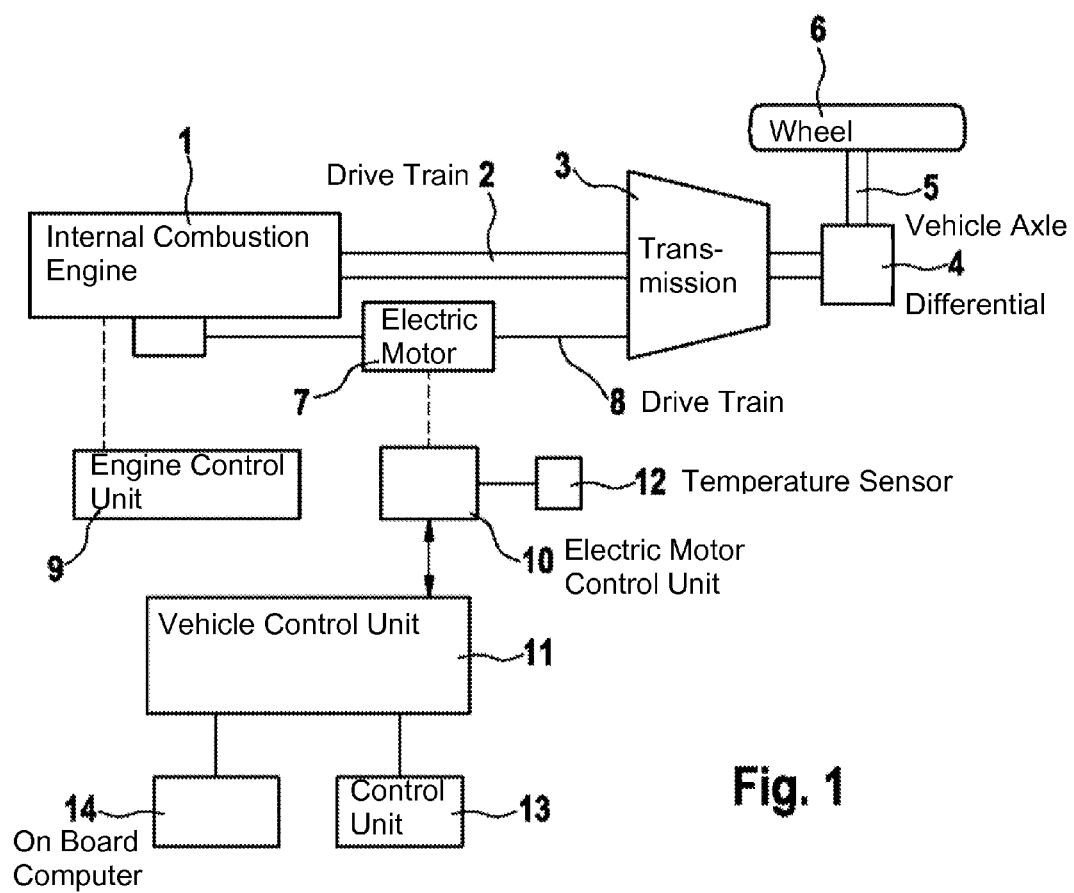
FIG. 1 shows a schematic diagram of a hybrid drive of a vehicle.

FIG. 1 shows a schematic view of a hybrid vehicle having an internal combustion engine 1 as a first drive unit. Internal combustion engine 1 is connected to a transmission 3 via a drive train 2. Transmission 3 in turn leads to a differential 4 which is connected to wheel 6 via vehicle axle 5, resulting in the power produced by internal combustion engine 1 being transferred to wheel 6.

An electric motor 7 is provided in the above example as a second drive unit. Electric motor 7 is designed as a permanently excited synchronous machine and has its own drive train 8 via which it is connected to transmission 3.

Transmission 3 transfers the power provided by electric motor 7 to wheel 6 via differential 4 and wheel axle 5.

Internal combustion engine 1 is controlled and regulated by engine control unit 9 and electric motor 7 is controlled and regulated by electric motor control unit 10. Electric motor control unit 10 is connected to a temperature sensor 12 for measuring the ambient temperature and to vehicle control unit 11. This vehicle control unit 11 in turn activates control unit 13 of the air conditioning system and on-board computer 14.

Figure 2:
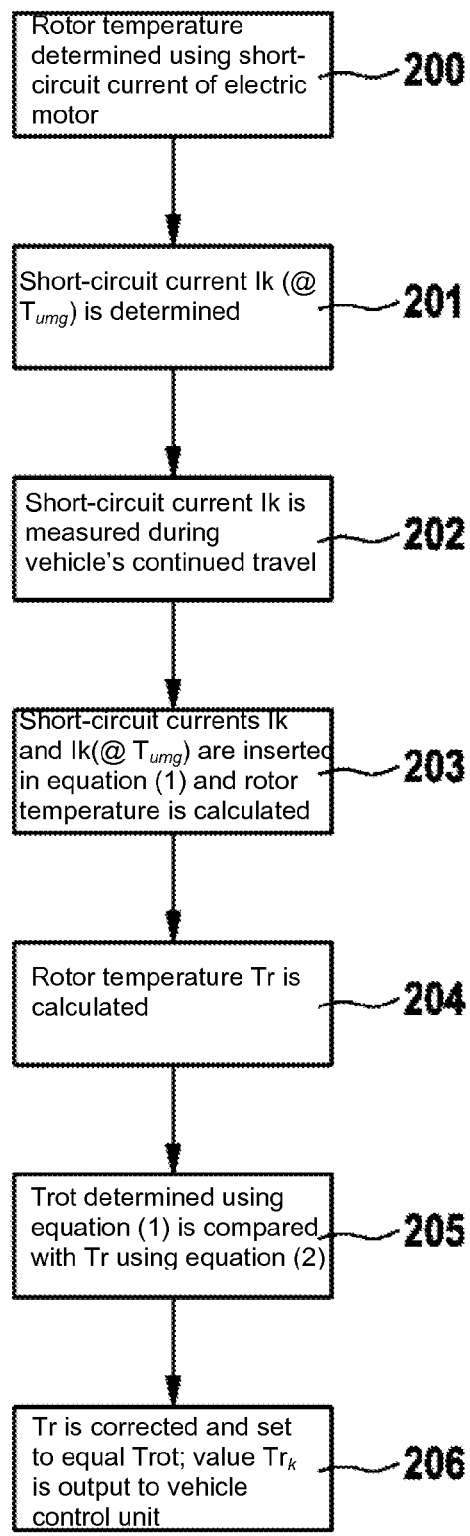
FIG. 2 shows an exemplary embodiment for determining the rotor temperature of an electric motor in a hybrid vehicle.

The method for determining the rotor temperature of an electric motor will be explained with reference to FIG. 2. In block 200, it is established that the rotor temperature will be determined using the short-circuit current of the electric motor based on the following equation:

$$Trot=(Ik/Ik(@T_{umg})-1)/cTr+T_{umg} \quad (1)$$

where:
Ik is the short-circuit current
Ik($@T_{umg}$) is the short-circuit current in the cold state of the hybrid vehicle
$T_{umg}$ is the ambient temperature
cTr is the temperature coefficient of the magnet material Short-circuit current Ik($@T_{umg}$) is first determined in block 201. At this point, the vehicle is at a standstill and it is assumed that internal combustion engine 1 and electric motor 7 have not been in operation for several hours. A measure for the vehicle at standstill is the so-called engine switch-off time which is available in control unit 9 of internal combustion engine 1 and indicates the period of time of standstill after which internal combustion engine 1 and electric motor 7 are at the same engine temperature.

If it is assumed that internal combustion engine 1 and electric motor 7 have not been operated for a predefined time, the vehicle is started and electric motor 7 is run up to a predefined rotational speed. Electric motor 7 is short-circuited and short-circuit current Ik($@T_{umg}$) of the electric motor is measured.

In step 202, short-circuit current Ik is measured during the hybrid vehicle's continued travel. This occurs when the setpoint torque of electric motor 7 equals zero, which is, for example, the case when stopping at a signal light. In this measurement as well, electric motor 7 is run up to a rotational speed higher than a specific speed so that it may be assumed that the rotational speed is not dependent on the rotor temperature. After that, electric motor 7 is short-circuited, which is accomplished in a simple manner by a shunt resistor (not described in greater detail) and short-circuit current Ik is measured.

In block 203, measured short-circuit currents Ik and Ik($@T_{umg}$) are inserted into equation (1) and the rotor temperature is calculated as a function of the short-circuit current in control unit 10 of electric motor 7. The necessary ambient temperature is determined using temperature sensor 12.

In block 204, rotor temperature Tr is calculated by using the temperature model according to the following equation:

$$Tr=[PsiE/PsiE20-1]/cTr+20° \text{ C}. \quad (2),$$

where:
Tr is the rotor temperature
PsiE is the magnetic flux linkage
PsiE20 is the magnetic flux linkage at 20° C.
cTr is the temperature coefficient of the magnet material.

In block 205, rotor temperature Trot determined using equation 1 is compared with rotor temperature Tr determined using equation 2. If differences exist, rotor temperature Tr is corrected in block 206 and set equal to Trot, value $Tr_k$ corrected in this manner being output to vehicle control unit 11 which monitors the temperature of the power components of all consumers in the hybrid vehicle.

If output rotor temperature $Tr_k$ exceeds a predefined limit value, vehicle control unit 11 decides which of the consumers will be switched off to keep the temperature level in the engine compartment on a defined level. In doing so, vehicle control unit 11 may, for example, switch off on-board computer 14.

Numerous tests show that the rotor temperature ascertained with the aid of the short-circuit current is constantly lower than the rotor temperature ascertained using the temperature model.

What is claimed is:

1. A method for determining a rotor temperature of an electric motor of a hybrid vehicle, the method comprising:
   ascertaining the rotor temperature of the electric motor by measuring one operating parameter of the electric motor during operation of the hybrid vehicle;
   wherein the rotor temperature is ascertained by measuring a short-circuit current of the electric motor; and
   wherein a first rotor temperature of the electric motor is ascertained using a computational algorithm and the second rotor temperature is ascertained by measuring the short-circuit current, the first and second rotor temperatures being compared with one another, and the first rotor temperature being corrected as a function of the second rotor temperature if a difference is detected.

2. The method according to claim 1, wherein the rotor temperature is calculated from the measured short-circuit current as a function of an ambient temperature.

3. The method according to claim 1, wherein after a second driving machine of the hybrid vehicle, including an internal combustion engine, is started, the electric motor is run up to a predefined rotational speed, the electric motor is then short-circuited, and the resulting short-circuit current is measured.

4. The method according to claim 1, wherein during travel of the hybrid vehicle, when a setpoint torque of the electric motor is equal to zero, the electric motor is short-circuited and the short-circuit current is measured.

5. The method according to claim 1, wherein if a difference is detected, the first rotor temperature is set to be equal to the second rotor temperature.

6. The method according to claim 1, wherein the corrected first rotor temperature is supplied for further processing in at least one control unit of the hybrid vehicle.

7. The method according to claim 6, wherein if the corrected first rotor temperature exceeds a limit value, a power of at least one electrical consumer of the hybrid vehicle is reduced.

8. A system for determining a rotor temperature of an electric motor of a hybrid vehicle, comprising:
- means for determining the rotor temperature of the electric motor by measuring an operating parameter of the electric motor during an operation of the hybrid vehicle;
- wherein the means for determining includes a control unit which determines the rotor temperature by measuring a short-circuit current; and
- wherein the control unit of the electric motor determines a first rotor temperature of the electric motor using a computational algorithm and a second rotor temperature by measuring the short-circuit current, the control unit comparing the first and second rotor temperatures with one another, the control unit correcting the first rotor temperature as a function of the second rotor temperature if a difference is detected.

9. The system according to claim 8, wherein the control unit is connected to at least one consumer control unit of the hybrid vehicle for transmission of the corrected first rotor temperature.

* * * * *

UNITED STATES PATENT AND TRADEMARK OFFICE
CERTIFICATE OF CORRECTION

PATENT NO.       : 8,494,801 B2
APPLICATION NO. : 12/992210
DATED            : July 23, 2013
INVENTOR(S)      : Pushkolli et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 306 days.

Signed and Sealed this

Fifteenth Day of September, 2015

Michelle K. Lee
*Director of the United States Patent and Trademark Office*